Sept. 6, 1938. P. A. WOOD Re. 20,851

BUILDING CONSTRUCTION

Original Filed Aug. 12, 1937 3 Sheets-Sheet 1

Inventor

Paul A. Wood,

By D. P. Walker

Attorney

Sept. 6, 1938. P. A. WOOD Re. 20,851

BUILDING CONSTRUCTION

Original Filed Aug. 12, 1937 3 Sheets-Sheet 2

Inventor

Paul A. Wood,

By D. P. Wallace

Attorney

Sept. 6, 1938. P. A. WOOD Re. 20,851

BUILDING CONSTRUCTION

Original Filed Aug. 12, 1937 3 Sheets-Sheet 3

Inventor

Paul A. Wood,

By D. P. Walker

Attorney

Reissued Sept. 6, 1938

Re. 20,851

UNITED STATES PATENT OFFICE 20,851

BUILDING CONSTRUCTION

Paul A. Wood, Roanoke, Va.

Original No. 2,116,859, dated May 10, 1938, Serial No. 158,804, August 12, 1937. Application for reissue May 14, 1938, Serial No. 208,061

15 Claims. (Cl. 72—102)

This invention relates to building construction, and more particularly to an improvement for rendering buildings damp-proof or water-proof while at the same time obtaining air conditioning and insulating effects through adequate ventilation.

While it has been heretofore proposed to construct buildings with hollow walls, made, for example, from hollow tile, and in some cases to provide spaced ventilating flues in masonry walls, as well as to provide dead air spaces in both interior and exterior walls, nevertheless, the same have not been wholly practical because, in most cases, special features of construction have been required which contribute to expense and also make general adaptation and application difficult under average prevailing conditions. For example, it has been proposed to provide the sub-grade walls of a building with an air space serving as a drain for water and which communicates with a plurality of separate relatively narrow flues in the wall of the building; also, to provide the wall with interior flashings and drain openings for the purpose of deflecting water to render them damp proof; and, even in some instances, walls with brick outer facings have been tied or connected directly to hollow tile interiors for the purpose of rendering the building rain or moisture proof. However, such structures do not provide definitely for inducing air circulation or ventilation and present dead air cells, which to a certain extent may serve as insulation for the building in general, but perform no other function. Moreover, these structures do not lend themselves readily to accepted simple and popular low cost building construction practices, such, for example, as standard masonry procedure, and are, therefore, not only expensive, but in many instances in actual use, do not provide the necessary strength to withstand floor loading stresses or wind pressure.

Accordingly, a primary object of the invention is to provide a masonry or equivalent building construction which accomplishes four very desirable features, namely, a thorough water-proofing of the masonry wall itself; adequate ventilation which not only tends to keep the wall dry but also air conditions the cellar or basement and individual rooms of the building; provides an insulating effect under seasonal temperature variations; and last but not least serves as a check or control for termite propagation due to temperature variation. That is to say, invention contemplates the use of standard building brick in constructing the wall which may be laid in the customary manner, but are so arranged as to provide inner and outer wall sections having a horizontally and vertically continuous air space throughout and therebetween, the said inner and outer walls being connected by anchors or headers at predetermined locations which not only tie the wall sections together at the intervals required for strength, but may also assist in effecting the drainage of any water that may be forced through the outer or facing wall of brick.

Another object of the invention is to provide a building construction which, in effect, may be kept automatically air conditioned by providing individual room ventilators so that circulation may be set up by convection currents rising from any enclosed chamber or room to the higher point of the building, or a fan creating a forced draft may be used. According to one form of installation the ventilators in the basement or lower chamber of the building may be provided with a system of shuters or a louvre panel which may be automatically controlled by a thermostat so that as the sun shines on one side of the building the shutters will be closed, while those on the shady side will be open, thus effecting automatic ventilation of the building as the sun travels, consequently maintaining a materially cooler building on hot days.

With the above and other objects in view which will more readily appear as the nature of the invention is better understood, the same consists in the novel construction, combination, and arrangement of parts, hereinafter more fully described, illustrated and claimed.

A preferred and practical embodiment of the invention is shown in the accompanying drawings in which—

Figure 1:
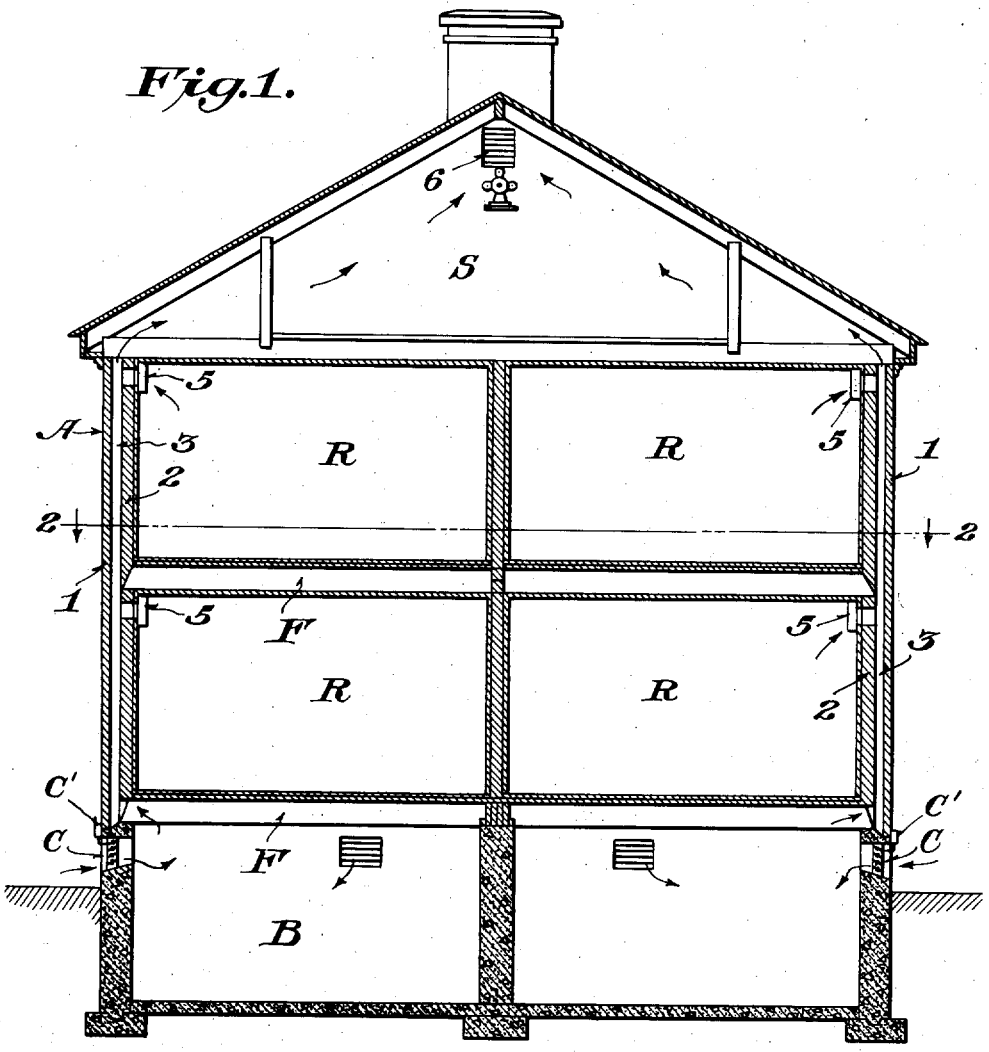
Figure 1 is a vertical section of a building embodying the present improvements.

According to the embodiment of the invention shown in the drawings the building includes the novel wall construction designated generally as A, hereinafter more fully referred to in detail, and comprising the outer wall section 1 and the inner wall section 2 having the horizontally and vertically continuous air space 3 therebetween.

The interior of the building, surrounded by the wall A, is provided with appropriate enclosed chambers or rooms designated generally as R formed by any desired type of floor construction designated generally as F. The basement of the building, designated generally as B, and which provides a lower air chamber for the building, may have its exposed wall face provided with the automatically controlled louvers, or vents C which include a thermostat C′ exposed to the sun. Also, between the ceiling of the basement and the first floor suitable ventilating openings 4 are provided to establish communication between the basement B and the air space 3. These openings 4 are preferably located between the floor joists, and may be of any desired dimension according to the spacing of the joists. Also, they are preferably covered with wire netting or screen material to prevent rodents or insects from communicating with the ventilating space 3 of the wall.

The vertical wall or walls of the rooms R, preferably near the ceiling, are provided with a ventilator 5 for also establishing communication between the individual rooms and the air space 3. These ventilators are preferably of the shutter type and may be manually or automatically controlled.

The air space 3 between the wall sections 1 and 2 communicates at its upper end with the upper air chamber or space S beneath the roof of the building. Usually this is what may be termed the attic of a house or it may be a specially provided upper chamber beneath the roof in the case of industrial or institutional buildings. The said space S or chamber is also provided with a ventilator or louver 6 which may communicate with a chimney or flue, or with the atmosphere as desired. In buildings of more expensive construction a fan or blower is used in connection with this ventilator.

Referring more especially to the novel construction of the entire wall A, it may be pointed out that the outer wall section 1 is connected or tied to the inner wall section 2 by suitable headers or anchoring members H. In constructing the building the foundation or sub-grade wall is first built with its upper edge of stepped or shouldered formation to provide the lower and upper shelves 7 and 8 connected by the outwardly inclined drain wall 8a. The outer wall section 1 is started by laying the first course of brick on the lower shelf portion 7 of the shoulder. The purpose of the drain wall or water-shed 8a is to direct water which may make its way through the completed outer wall section outwardly of the building through suitable weep holes 9 formed beneath the lower face of the first course of brick on the outer wall section.

Figure 5:
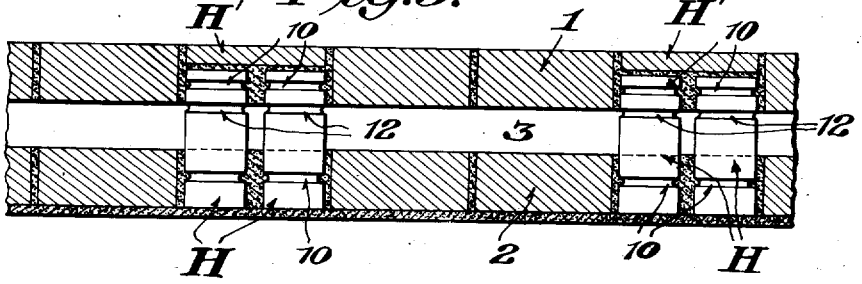
Figure 5 is a detail plan view of a portion of the wall laid in accordance with the present invention.
Figure 3:
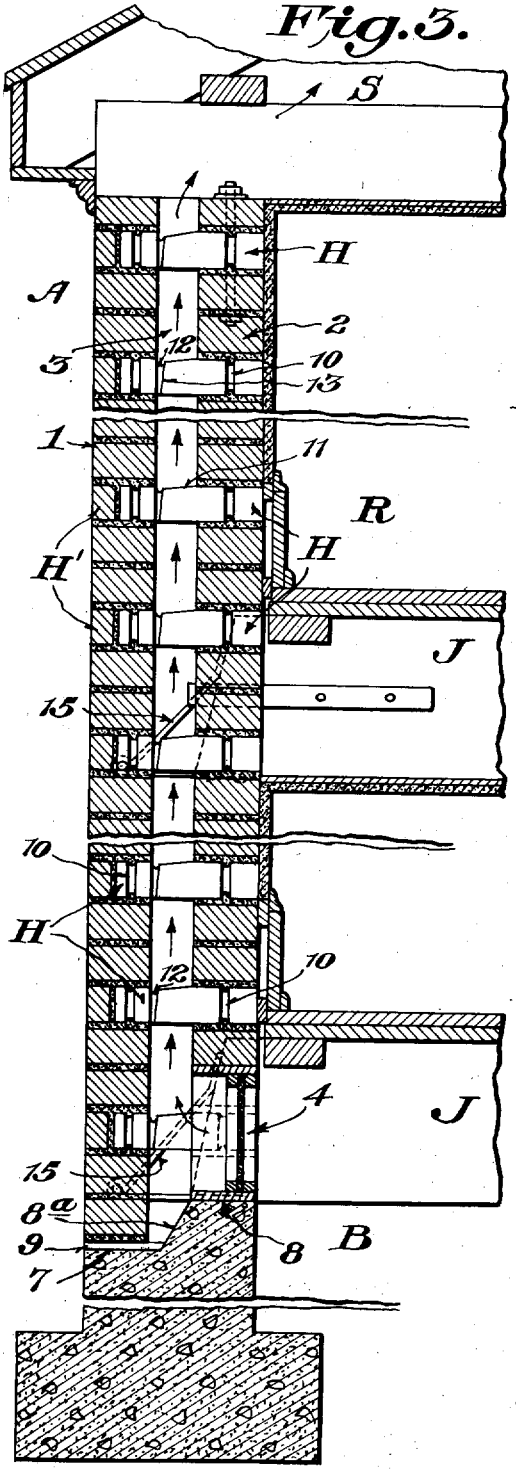
Figure 3 is an enlarged vertical sectional view of a portion of a wall of the building embodying the present improvements.

The first course of brick for the inner wall section 2 is laid on the upper shelf 8 of the foundation wall but is spaced therefrom a suitable distance as will be apparent from Figure 3. As the outer and inner wall sections 1 and 2 are built upwardly by laying the individual bricks in conventional fashion they are connected or anchored at spaced intervals by the headers H. For example, the headers H may be laid at every fourth vertical course of the brick although it will, of course, be understood that they may be spaced closer or farther apart, as requirements or specifications may dictate. Likewise, the headers may be horizontally spaced as desired but preferably are located at every fourth brick, and may be in pairs as shown in Figure 5.

The outer ends of the headers are preferably masked or concealed by a facing brick H′ while the inner ends thereof in the case of a ten inch wall, extend to the inner face of the inner wall section 2. In the case of light building structures such as moderate houses or homes, two four inch wall sections 1 and 2 spaced two inches apart are sufficient. However, it will, of course, be understood that in the case of industrial or institutional buildings, the inner wall section 2 may be made thicker, that is, instead of a four inch inner wall section it may be necessary to provide an eight or twelve inch inner wall section. In the latter case the inner ends of the headers will be covered by the extra wall thickness. However, it will be apparent that this is a constructional detail which does not alter the principles of the invention. In all cases the outer wall section 1 is spaced approximately two inches from the inner wall section 2 to provide drainage and ventilation.

The headers H may be made of various materials. For example, they may be made of the same ceramic materials as ordinary brick, or they may be glazed or vitrified, or, on the other hand, it may be expedient to mold them from concrete. The headers may also be made of reinforced cinder concrete using water-proof cement or other water-proofing material, and may be made of any thickness and width according to the specifications of the brick wall into which they are to be incorporated. In other words, in practice, it is desirable to dip the headers in a suitable water-proof material to prevent the seepage of water from the front wall section to the rear wall section to insure a thoroughly water-proof construction. Or, on the other hand use a water-proof mortar on the end of the tie brick, namely, the end of the brick which is embedded in the outer wall section.

Moreover, the headers H have special features which assist in keying or locking them into the wall and also draining water away from the inner wall section 2. As will be apparent from Figures 6 and 7 the headers may be provided inwardly of their ends with suitable bonding grooves 10 which receive the mortar between the bricks of the wall thereby firmly to lock the headers in place and tie the two wall sections in spaced relation. The top of the header is preferably inclined for a portion of its length as indicated at 11 in Figure 7 toward a drip or drain groove 12. This groove is preferably relatively wide at the top of the header and narrows or tapers as at 13 where it extends downwardly along the sides of the header so that any water that may seep through the outer wall 1 and make its way to the header will be deflected or directed toward the inside face of the outer wall and thereby proceed downwardly through the space 3 to the drain surface 8a of the foundation wall.

Figure 6:
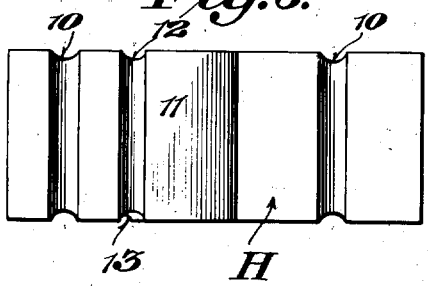
Figures 6 and 7 are respectively top plan and side views of a header used for connecting the inner and outer walls.
Figure 7:
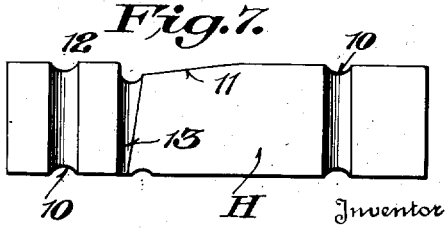
Figure 2:
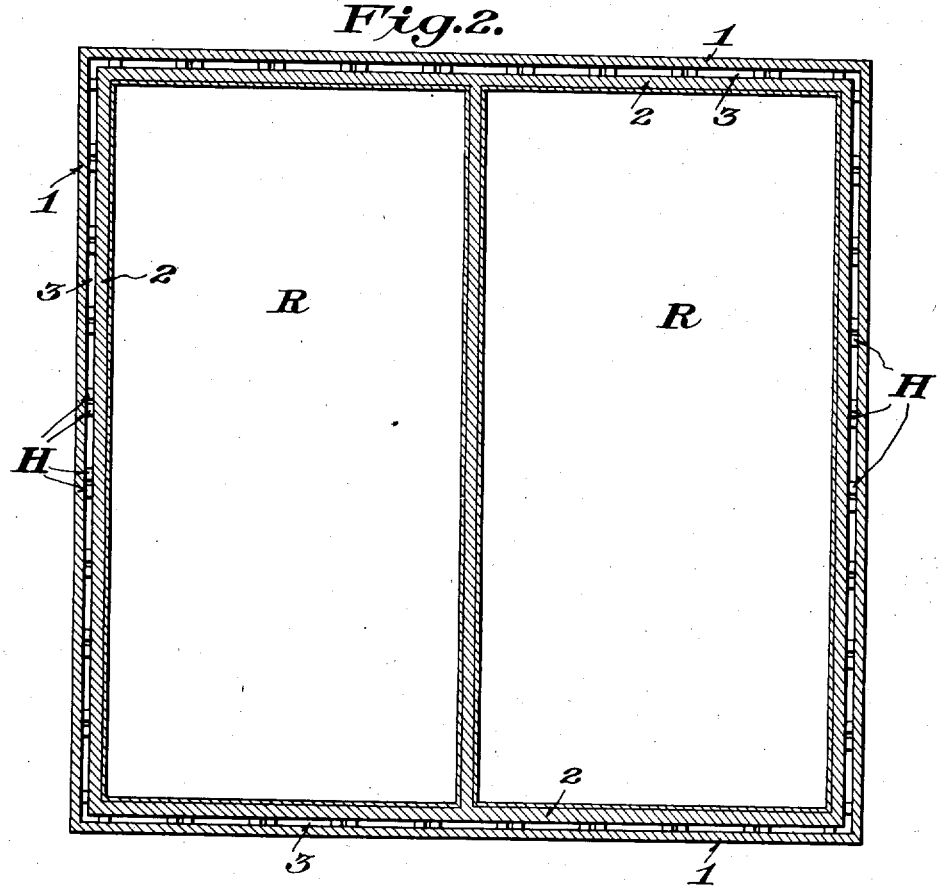
Figure 2 is a diagrammatic view showing a horizontal cross-section of the building to illustrate the continuity of the air space about the building.

While it is preferred to use headers of the type shown in Figures 6 and 7, nevertheless, it will, of course, be understood that it is still within the scope of the present invention to use ordinary water-proofed brick as headers, or any form of header which will tie the outer and inner wall sections together effectively. That is to say, even a metal header, suitably formed, may be used in order to obtain the objective of the present invention.

Figure 4:
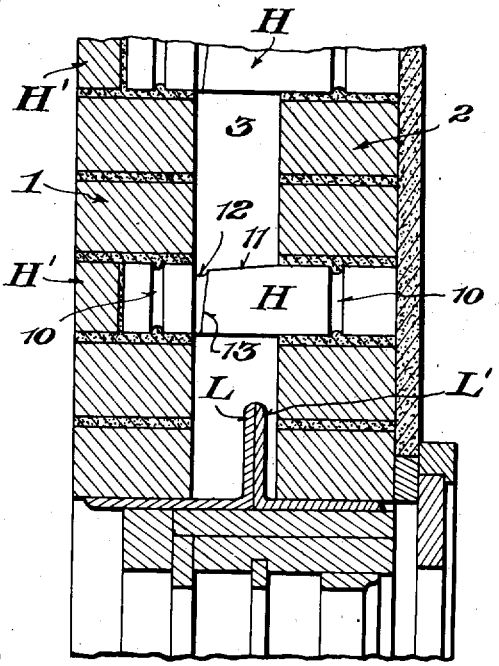
Figure 4 is a detail vertical sectional view illustrating the construction at the head of a window or other opening.
Figure 8:
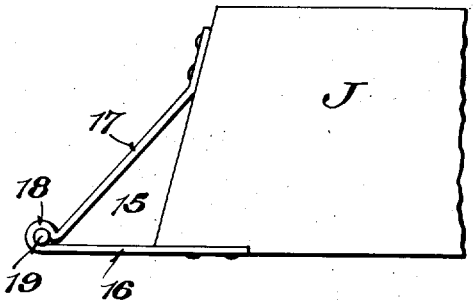
Figure 8 is a detail view of an auxiliary joist or beam support for carrying the load to the outer wall section.

As will be apparent from Figure 4 the present invention makes adequate provision for carrying the vertical and horizontal continuous air space between the wall sections throughout the entire building, even at the location of doors or windows. That is to say, where a door or window occurs in a wall A, it is proposed to provide a suitable water deflecting lintel at the top of the door or window frame. As shown in Figure 4, the top of the opening is provided with metal lintels L and L' of angle formation, the vertical legs of the angles being laid back to back within the drainage and air space 3 and preferably spaced closer to the inner wall section 2 than the outer wall. Thus, any water that seeps through the outer wall will be caught by the section L of the lintel which is arranged beneath the outer wall and drained outwardly of the window or door frame, and not inwardly.

In connection with the floor construction it may be pointed out that the joist may be supported by or rest on the inner wall section entirely. However, in cases where it is desired directly to distribute the load over both wall sections the joists J may have their ends fitted with a wall bracket 15 which spans the air space 3. This bracket is in the form of a strap or strip of metal having the legs 16 and 17 adapted to be attached or secured respectively to the bottom and end of the joists while the bight or loop 18 carrying an anchor rod 19 is embedded in a mortar course of the outer wall section as shown in Figure 3. The lower leg of the bracket is in loading engagement with the outer wall and is tied thereto by the anchor pencil or rod 19.

From the foregoing, it will be apparent that the present construction provides a water-proof and ventilated wall which entirely surrounds the building and presents practically no impedance or obstruction to free water drainage and circulation of air between the inner and outer wall sections from the basement to the roof.

Moreover, the present construction is particularly effective in providing desired ventilation of the entire building due to the fact that the hot air which ordinarily accumulates under the roof will escape through the ventilator 6 and not penetrate the upper rooms of the structure. In other words, the hot air accumulating beneath the roof will, because of its ability to escape, induce circulation currents automatically from the individual rooms as well as the basement of the building through the continuous air space 3.

In the summer the cool air from the basement travelling through the continuous air space 3 will serve to insulate the building against excessive heat, and, on the other hand, in winter when a heating plant is in operation in the basement, the warm air from the basement will circulate upwardly through the air space and thus tend to keep the building appreciably warmer. In other words, the construction of the present invention materially aids in insulating the entire building both in summer and in winter because in winter fuel consumption is reduced because of the circulation effects of warm air previously referred to.

Aside from providing ventilation for the individual rooms, an important factor is the provision of ventilation from the basement or cellar, because by providing such ventilation the temperature in the basement or cellar may be changed as much as twenty degrees. It has been found that by changing the temperature in the basement of a building and also eliminating moisture, the breeding of termites is prevented. In other words, termites cannot survive a relatively dry atmosphere, nor can they survive changes in the temperature within a certain range. Therefore, with the present construction, it is possible to reduce if not entirely eliminate the hazards incident to termite infestation.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. In a building construction, a foundation wall having its upper edge formed with upper and lower shelf portions connected by an outwardly inclined draining wall, outer and inner masonry wall sections laid in spaced relation on said upper and lower shelf portions, weep holes provided between the outer wall and the lower shelf portion of the foundation wall and tie elements connecting said outer and inner wall sections.

2. In a building construction, a wall comprising spaced outer and inner wall sections to provide drainage and ventilating means within the wall, a frame fitted into an opening in said wall sections, and means disposed across said frame within the space between the wall sections to provide for deflecting water toward the inner face of the outer wall section.

3. In a building construction, a wall comprising outer and inner wall sections having an intermediate vertically and horizontally continuous space therebetween, said wall having an opening for receiving a window or a door frame, a frame fitted into said opening, and a lintel for covering said frame within and about the opening in the wall, said lintel including a pair of angle members with the vertical legs thereof arranged in abutting relation and disposed in the space between said wall sections while the horizontal legs of the angles are fitted beneath the wall sections at the opening therein, and said vertical leg portions constituting a barrier for preventing the seepage of water from the outer wall section to the inner wall section and also serving to deflect water around and about said frame toward the outer wall section.

4. In a building construction, a water-proof wall including co-extensive outer and inner spaced wall sections and tie elements spanning the space between said sections, said tie elements having communicating drainage grooves at the top and sides thereof located adjacent the inside face of the outer wall section.

5. In a building construction, a water-proof wall including co-extensive outer and inner spaced wall sections and tie elements spanning the space between said sections, said tie elements having communicating drainage grooves at the top and sides thereof located adjacent the inside face of the outer wall section, said tie elements also having mortar keying grooves in opposite ends thereof for embodiment respectively in the outer and inner wall sections to tie the same together.

6. In a building construction, a wall construction including co-extensive outer and inner spaced wall sections, and tie elements spanning the space between said sections, said tie elements having communicating drainage grooves at the top and sides thereof located adjacent the inside face of the outer wall section, said top groove having one edge contiguous to a drainage surface inclined thereto for the purpose of directing water outwardly from the inner wall and into said drainage grooves.

7. A building construction comprising spaced inner and outer walls and floor supporting joists supported at their ends in and on the inner wall, each joist being provided at its ends with metal load transferring extensions crossing the space between said inner and outer walls and seated on the outer wall.

8. In a building construction, a waterproof wall including co-extensive outer and inner spaced apart vertical wall sections, and tie elements inserted into said wall sections and spanning the space between them, said tie elements being provided with mortar interlocking grooves and also provided with vertical drainage passages within the vertical plane of the space between the walls.

9. In a building construction, a waterproof wall including co-extensive outer and inner spaced apart vertical wall sections, tie elements inserted into said wall sections and spanning the space between them, said tie elements being provided with mortar interlocking grooves and also provided with drainage passages within the vertical plane of the space between the walls, said tie elements being shorter in length than the total thickness of the wall and having their outer ends disposed a distance inwardly from the outer face of said outer wall, and wall facing elements filling the space beyond said outer ends of the tie elements.

10. A building construction comprising spaced inner and outer walls, and floor supporting joists supported at their inner ends in and on the inner wall, each joist being provided at an end with a load transferring extension crossing the space between said inner and outer walls.

11. A building construction including a wall, a floor joist supported on said wall, and a metal load transferring extension connected to the end of the joist and embedded in the wall near the outer face thereof and concealed within said wall, said extension centering the floor load on the wall to eliminate outward thrust on the wall.

12. A building construction comprising spaced inner and outer walls, and floor supporting joists supported at their inner ends in and on the inner wall, each joist being provided at an end with a load transferring extension crossing the space between said inner and outer walls, and anchoring means carried by the outer end of said extension for embedment in the outer wall.

13. In a building construction, a wall including co-extensive outer and inner spaced apart wall sections, and tie elements inserted into said wall sections and spanning the space between them, said tie elements having a plurality of mortar interlocking elements for embedment respectively in the outer and inner wall sections.

14. In a building construction, a waterproof wall including co-extensive outer and inner spaced apart wall sections and tie bricks for embedment at their ends in the outer and inner wall sections and spanning the space between said sections, said bricks having means between the ends for insuring the deflection of water tending to pass from the outer wall to the inner wall.

15. In a building construction, a masonry wall including outer and inner wall sections, spaced apart vertically and horizontally throughout the wall, tie elements arranged in transverse pairs at intervals between the outer and inner wall sections and spanning the space between them, said tie elements each having one end embedded in the inner wall section and the other end terminating within the outer wall section, and means for masking the ends of both tie elements anchored in the outer wall to preserve uniformity in the masonry at the exposed face of the outer wall section and also shielding the tie elements from direct exposure to the weather.

PAUL A. WOOD.